US006459706B1

United States Patent
Hayasaka

(10) Patent No.: US 6,459,706 B1
(45) Date of Patent: *Oct. 1, 2002

(54) MESSAGE-PASSING COMMUNICATION SYSTEM GENERATING TASK FOR MONITORING A SPECIFIC COMMUNICATION PATH

(75) Inventor: Takeshi Hayasaka, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/195,223

(22) Filed: Nov. 18, 1998

(30) Foreign Application Priority Data

Nov. 20, 1997 (JP) ............................... 9-320003

(51) Int. Cl.⁷ .................................. H04J 3/16
(52) U.S. Cl. .................... 370/466; 709/100; 370/412
(58) Field of Search ................ 370/252, 352, 370/412, 466; 709/224, 100, 101, 223, 230, 102, 107

(56) References Cited

U.S. PATENT DOCUMENTS

| | | | | |
|---|---|---|---|---|
| 5,726,979 A | * | 3/1998 | Henderson et al. | 370/254 |
| 5,909,443 A | * | 6/1999 | Fichou et al. | 370/412 |
| 6,009,097 A | * | 12/1999 | Han | 370/395 |
| 6,052,371 A | * | 4/2000 | Lemieux | 370/395 |
| 6,078,582 A | * | 6/2000 | Curry et al. | 370/356 |

FOREIGN PATENT DOCUMENTS

| | | |
|---|---|---|
| JP | 62-118655 | 5/1987 |
| JP | 3-85653 | 4/1991 |
| JP | 3-92056 | 4/1991 |
| JP | 3-158947 | 7/1991 |
| JP | 3-286218 | 12/1991 |
| JP | 6-103186 | 4/1994 |
| JP | 8-79294 | 3/1996 |

* cited by examiner

Primary Examiner—Chau Nguyen
Assistant Examiner—Jasper Kwoh
(74) Attorney, Agent, or Firm—Sughrue Mion, PLLC

(57) ABSTRACT

A message-passing communication system including plural communication paths that can be simultaneously used for inter-process communication by which data is received without predetermining the address in order to avoid undesirable consumption of CPU resources is provided. The message passing communication system includes user memory areas having one or more communication tasks wherein each communication task monitors only one of the communication paths, interprets the communication protocol used for the monitored communication path, and converts the communication protocol into a predetermined communication protocol when data is sent via the monitored communication path. The user memory areas also include an arrival-data queuing unit for storing plural data in the order of arrival and a user task for extracting the data stored in the arrival-data queuing unit wherein, the user task interprets the predetermined communication protocol and executes a user application program using the extracted data.

2 Claims, 2 Drawing Sheets

MESSAGE-PASSING COMMUNICATION SYSTEM GENERATING TASK FOR MONITORING A SPECIFIC COMMUNICATION PATH

BACKGROUND OF THE INVENTION

1. Field of the Invention

The present invention relates to a message-passing communication system suitable for inter-process communication which simultaneously uses plural communication paths. There are various kinds of inter-process communication, such as communication via TCP/IP, communication using a shared memory, and communication using specific hardware.

This application is based on Patent Application No. Hei 9-320003 filed in Japan, the contents of which are incorporated herein by reference.

2. Description of the Related Art

Japanese Patent Application, First Publication No. Hei 3-158947 shows an example of a conventional communication system. In this example, it is possible to simultaneously operate and dynamically switch plural communication processes (i.e., protocols) by using a communicating device, protocol control processing, and a unified application interface.

This conventional example is based on the premise that the addressee or receiver at the time of sending data and the addresser or sender at the time of receiving data are fixed and a communication path relating to the addressee at the time of sending data and a communication path relating to the addresser at the time of receiving data can be uniquely determined. That is, an operation for receiving data in the order of arrival without identifying the addresser is not considered.

In the above-described conventional example, when there are plural communication paths which can be simultaneously used, it is possible to simultaneously use these paths and dynamically change the path to be used. However, there have been the following problems:

(1) In the data receiving process, there are plural possible paths for receiving data, and it is necessary to monitor all the paths; thus, CPU resources are consumed via the monitoring operation even though data are not actually received.

(2) In the data receiving process, if each addresser is not designated and the receiving operation is performed depending on the order of receipt of data, the performance may not depend on the actual order of receiving but may depend on the order of monitoring each data.

SUMMARY OF THE INVENTION

In consideration of the above circumstances, the present invention relates to a communication system including plural communication paths which can be simultaneously used for inter-process communication, and an objective of the present invention is to provide a message-passing communication system by which data can be received in the order of receiving without predetermining the addressers, thereby avoiding undesirable consumption of CPU resources and dependence on the order of monitoring.

Therefore, the present invention provides a message-passing communication system for inter-process communication. The system comprises plural communication paths which can be simultaneously used and user memory areas for performing communication via the communication paths, wherein each user memory area includes:

one or more communication tasks, each communication task to monitor only one of the communication paths, interpret the communication protocol which is used for the monitored communication path, and to convert the communication protocol into a predetermined communication protocol when data is sent via the monitored communication path;

an arrival-data queuing unit for processing plural data in the order of arrival of the data and storing the data in a queue; and a user task for extracting the data stored in the arrival-data queuing unit and for interpreting said predetermined communication protocol and executing a user application program using the extracted data.

Accordingly, the user task for executing a user application program can use or process the data queued in the arrival-data queuing unit from the head of the queue, without identifying the plural communication paths. In addition, the user task does not need to identify plural communication protocols because the communication protocol of the queued data after the conversion can be interpreted by the user task.

Consequently, data can be received in the order of receiving without predetermining the addressers, and thereby undesirable consumption of CPU resources and dependence on the order of monitoring can be avoided.

DESCRIPTION OF THE PREFERRED EMBODIMENTS

Hereinbelow, an embodiment according to the present invention will be explained with reference to the drawings.

(1) Structure

Figure 1:
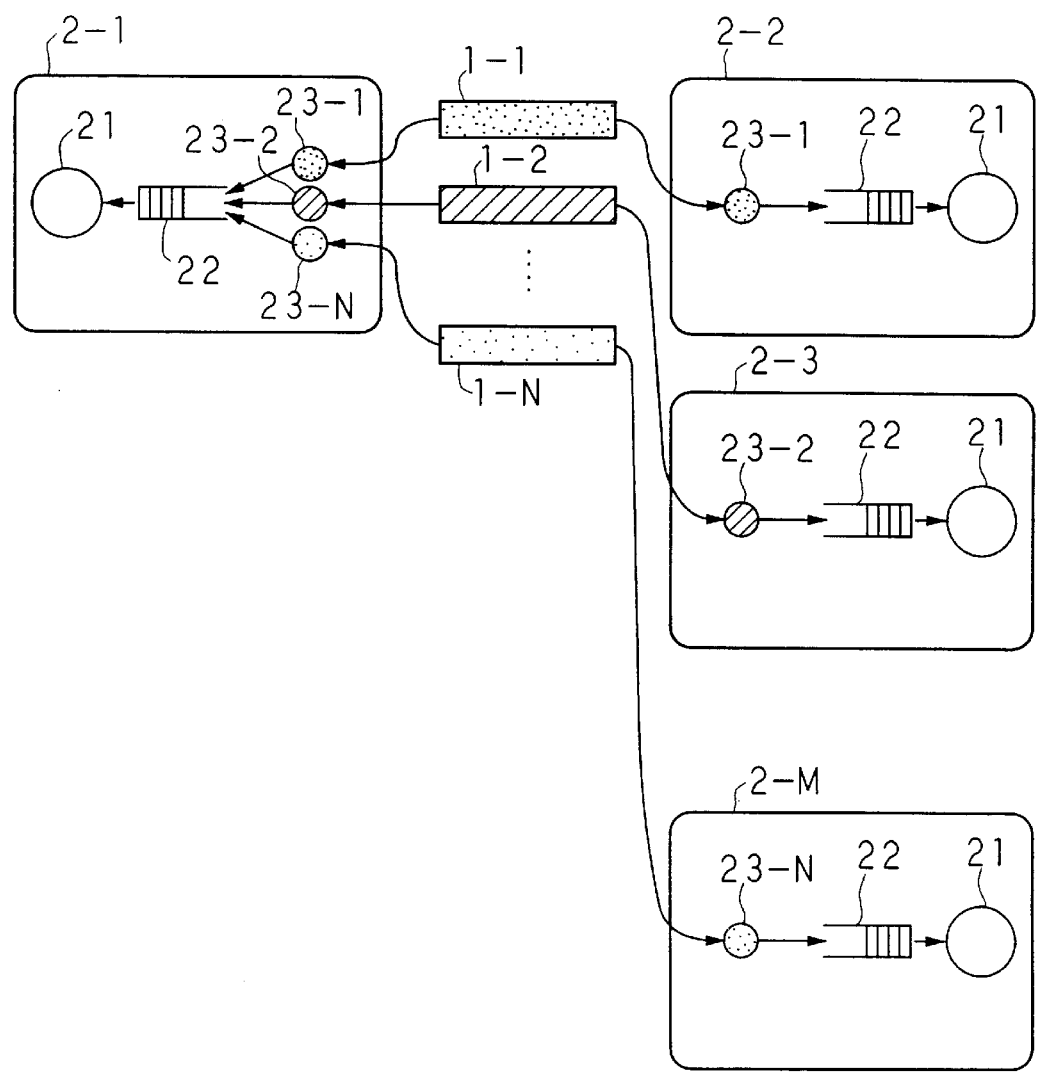
FIG. 1 is a diagram showing the system arrangement relating to an embodiment according to the present invention.

FIG. 1 is a diagram showing the system arrangement relating to an embodiment according to the present invention. With reference to FIG. 1, in the system comprising communication paths 1-1 to 1-N which can be simultaneously used, reference numerals 2-1 to 2-M indicate user (memory) areas (corresponding to user application programs) which can use these communication paths at the same time. Each user area comprises user task 21 for executing a user application program, data arrival queuing unit 22 (or mechanism) for processing data in the order of arrival, and communication task 23 for monitoring data received via a predetermined communication path and for interpreting the communication protocol with respect to the communication path and converting the protocol into another predetermined kind of protocol. The communication task 23 is generated according to the communication path to be used; thus, in FIG. 1, reference numerals 23-1, 23-2, . . . , 23-N are used for indicating each task.

(2) Operation

Hereinbelow, operations at the time of receiving data will be explained in detail.

In each user area 2, a communication task corresponding to the communication path to be used (e.g., communication task 23-1) is generated. Each generated communication task monitors one of the N kinds of communication paths 1-1, 1-2, . . . 1-N. Thus, communication task 23-1 in FIG. 1 constantly monitors the communication path 1-1. In communication task 23-1, after data arrival is detected, the data protocol corresponding to the relevant communication path (1-1) is interpreted and data is received, and the protocol is converted to the predetermined form which can be interpreted by the user task and the relevant data is transferred to the arrival-data queuing unit 22.

The arrival-data queuing unit 22 then adds the data transferred by communication task 23-1 to the end of the data queue. In this operation, if plural data arrive almost at the same time via different communication paths and necessary protocol conversion is performed by each communication task and the relevant communication tasks send queuing requests to arrival-data queuing unit 22 almost simultaneously, then arrival-data queuing unit 22 processes these requests in turn. That is, in the arrival-data queuing unit 22, plural data which arrived at the relevant user area via the communication paths (such as 1-1, 1-2, . . . , 1-N) are queued in the order of arrival. Therefore, a data receiving operation in the order of data arrival, without designating the addressers, can be performed by extracting data from the head of the queue in the arrival-data queuing unit 22.

In the operation for monitoring data arrival performed by communication task 23-1, the object to be monitored is only the communication path which is under the charge of task 23-1, that is, communication path 1-1. Therefore, the communication task 23-1 may perform a monitoring operation using a busy waiting loop, or may select a suitable monitoring procedure according to the relevant communication path. Accordingly, a waste of CPU resources can be avoided.

Similarly, plural data sent via different communication paths (1-2, 1-3, . . . , 1-N) are respectively monitored by different communication tasks (23-2, 23-3, . . . , 23-N); thus, processes depending on the order of monitoring are also unnecessary.

The receiving operation described in the user-side program is executed by user task 21 in user area 2. If the addressers are not designated, the following steps are performed.

Step 1: The user task 21 tries to extract data from the head of the queue in the arrival-data queuing unit 22.

Step 2: If no data to be extracted exists in arrival-data queuing unit 22, then the processing returns to Step 1 so as to try to extract data again.

Step 3: If arrival data exists, then the necessary receiving operation is performed.

On the other hand, if the addressers are designated in the receiving operation, the following steps are performed.

Step 1: The user task 21 tries to extract data from the arrival-data queuing unit 22. Here, data at the head of the queue is not always extracted, but data from a designated addresser is extracted.

Step 2: If no data to be extracted exists in the arrival-data queuing unit 22, then the processing returns to Step 1 so as to try to extract data again.

Step 3: If arrival data exists, then the necessary receiving operation is performed.

EXAMPLE

Hereinbelow, an example relating to the above embodiment will be shown with reference to the drawings.

(1) Structure

Figure 2:
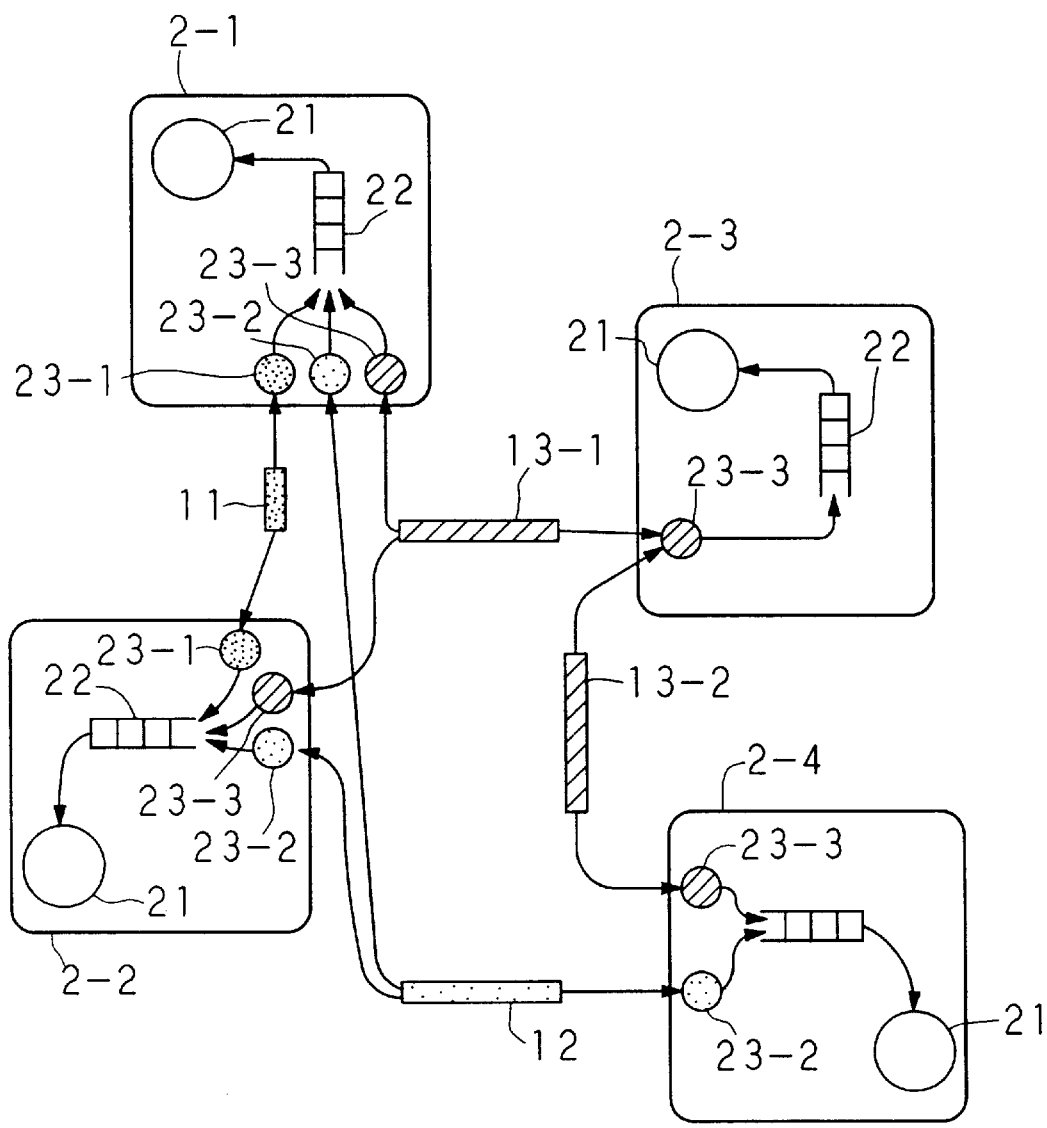
FIG. 2 is a diagram showing the system arrangement relating to an example according to the above embodiment.

FIG. 2 is a diagram showing the system arrangement relating to an example according to the above embodiment. This arrangement is for performing inter-process communication between four processes conducted by four application programs corresponding to four user areas 2-1 to 2-4.

There are three kinds of communication paths 11 to 13 (corresponding to different protocols) which can be simultaneously used. The relationships between each user area and used communication paths are shown below. Communication between user areas 2-1 and 2-2 is performed via communication path 11; communication between user areas 2-1 and 2-3 is performed via communication path 13-1; communication between user areas 2-1 and 2-4 is performed via communication path 12; communication between user areas 2-2 and 2-3 is performed via communication path 13-1; communication between user areas 2-2 and 2-4 is performed via communication path 12; and communication between user areas 2-3 and 2-4 is performed via communication path 13-2.

In the user area 2-1, three kinds of communication paths are used; thus, three kinds of communication tasks 23-1, 23-2, and 23-3 are generated. The user area 2-2 also uses three kinds of communication paths; thus, three kinds of the communication tasks are generated. The user area 2-3 uses only one kind of communication path 13; thus, only one kind of communication task is generated.

The user area 2-4 uses two kinds of communication paths; thus, two kinds of communication tasks are generated. On the other hand, a single user task 21 and a single arrival-data queuing unit 22 are respectively provided in each user area regardless of the number of communication paths to be used.

(2) Operations

Hereinbelow, operations of this example will be explained with reference to FIG. 2.

Here, it is assumed that user areas 2-2, 2-3, and 2-4, respectively, send data to user area 2-1, and that user area 2-1 receives data in the order of data arrival.

Data from user area 2-2 is sent to user area 2-1 via communication path 11; data from user area 2-3 is sent to user area 2-1 via communication path 13-1; and data from user area 2-4 is sent to user area 2-1 via communication path 12.

The data sent via communication path 11 from user area 2-2 is received in the user area 2-1, and the data protocol is converted by communication task 23-1 and the data is transferred to the arrival-data queuing unit 22. The data sent via communication path 13-1 from user area 2-3 is received in the user area 2-1, and the data protocol is converted by communication task 23-3 and the data is transferred to the arrival-data queuing unit 22. Similarly, the data sent via communication path 12 from user area 2-4 is received in the user area 2-1, and the data protocol is converted by communication task 23-2 and the data is transferred to the arrival-data queuing unit 22.

Each communication task generates and sends a queuing request to the arrival-data queuing unit 22 at the time of transferring data, and the data are stored in the queue in the order of the generated requests. If the requests are generated almost at the same time, the arrival-data queuing unit 22 suitably processes them in turn and determines the order. In the user area 21, data are extracted from the head of the queue in the arrival-data queuing unit 22; thus, the receiving operation is performed in the order of data arrival.

What is claimed is:

1. A message-passing communication system for inter-process communication, the system comprising:

plural communication paths, using at least two communication protocols, which can simultaneously communicate between respective communication tasks; and plural user memory areas for performing communication via the communication paths, wherein each user memory area includes:

one or more communication tasks, each communication task associated with a communication protocol to dedicatedly monitor only one of the communication paths which has a same communication protocol as the associated communication task, interpret the communication protocol which is used for the monitored communication path; and to convert the communication protocol into a predetermined communication protocol of a user task when data is sent via the monitored communication path and output the data having the converted communication protocol;

an arrival-data queuing unit processing the data outputs from a plurality of communication tasks serially in the order of arrival of the data outputs and storing the data in a queue within said queuing unit; and a user task for extracting the data stored in the arrival-data queuing unit and for interpreting said predetermined communication protocol and executing a user application program using the extracted data.

2. A message-passing communication system as claimed in claim 1, wherein the user task extracts data from the head of the queue in the arrival-data queuing unit.

* * * * *